(12) United States Patent
Lecointe et al.

(10) Patent No.: US 7,082,764 B2
(45) Date of Patent: Aug. 1, 2006

(54) BURNT GAS-SCAVENGING INDIRECT-INJECTION INTERNAL-COMBUSTION SUPERCHARGED ENGINE AND SUPERCHARGED AIR SUPPLY METHOD FOR SUCH AN ENGINE

(75) Inventors: Bertrand Lecointe, Nanterre (FR); Stéphane Venturi, Roiffieux (FR); Richard Tilagone, Les Cotes D'Arey (FR); Pierre Leduc, Beynes (FR); Vivien Delpech, Sainte-Colombe (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/870,964

(22) Filed: Jun. 21, 2004

(65) Prior Publication Data

US 2004/0255907 A1   Dec. 23, 2004

(30) Foreign Application Priority Data

Jun. 20, 2003   (FR) .................................. 03 07578

(51) Int. Cl.
*F02B 27/02* (2006.01)
*F02B 33/00* (2006.01)
*F02M 35/10* (2006.01)
*F02M 35/104* (2006.01)
*F02M 51/00* (2006.01)

(52) U.S. Cl. ................... 60/600; 123/184.45; 123/432; 123/559.1; 123/564

(58) Field of Classification Search ................ 60/600; 123/184.45, 432, 559.1, 564
See application file for complete search history.

(56) References Cited

U.S. PATENT DOCUMENTS

| 4,809,649 | A | * | 3/1989 | Brinkman | .................... 123/432 |
| 5,230,320 | A | * | 7/1993 | Hitomi et al. | ............... 123/432 |
| 5,379,743 | A | * | 1/1995 | Stokes et al. | ........... 123/568.18 |
| 5,549,095 | A | * | 8/1996 | Goto et al. | ............... 123/559.1 |
| 5,553,580 | A | * | 9/1996 | Ganoung | ..................... 123/432 |
| 6,032,634 | A |   | 3/2000 | Minegishi | .............. 123/184.55 |
| 6,951,211 | B1 | * | 10/2005 | Bryant | ..................... 123/559.1 |

FOREIGN PATENT DOCUMENTS

| DE | 19813747 |   | 3/1999 |
| FR | 2841294 A1 | * | 12/2003 |
| GB | 2287985 |   | 10/1995 |
| JP | 03151531 A | * | 6/1991 |
| JP | 03151532 A | * | 6/1991 |

OTHER PUBLICATIONS

Patent Abstracts of Japan, vol. 1995, No. 2, Mar. 31, 1995 & JP 6 330758 Nov. 29, 1994.

* cited by examiner

*Primary Examiner*—Sheldon J Richter
(74) *Attorney, Agent, or Firm*—Antonelli, Terry, Stout and Kraus, LLP.

(57) ABSTRACT

The present invention relates to a supercharged internal-combustion, notably indirect-injection engine comprising at least one cylinder (10) with two types of supercharged air intake means (12, 14), one type for non-carbureted supercharged air intake (12) and another type for carbureted supercharged air intake (14), said intake means being supplied with supercharged air by supply means (38).

According to the invention, supply means (38) comprise a specific supercharged air supply device (46, 50) for each type of intake means (12, 14).

20 Claims, 3 Drawing Sheets

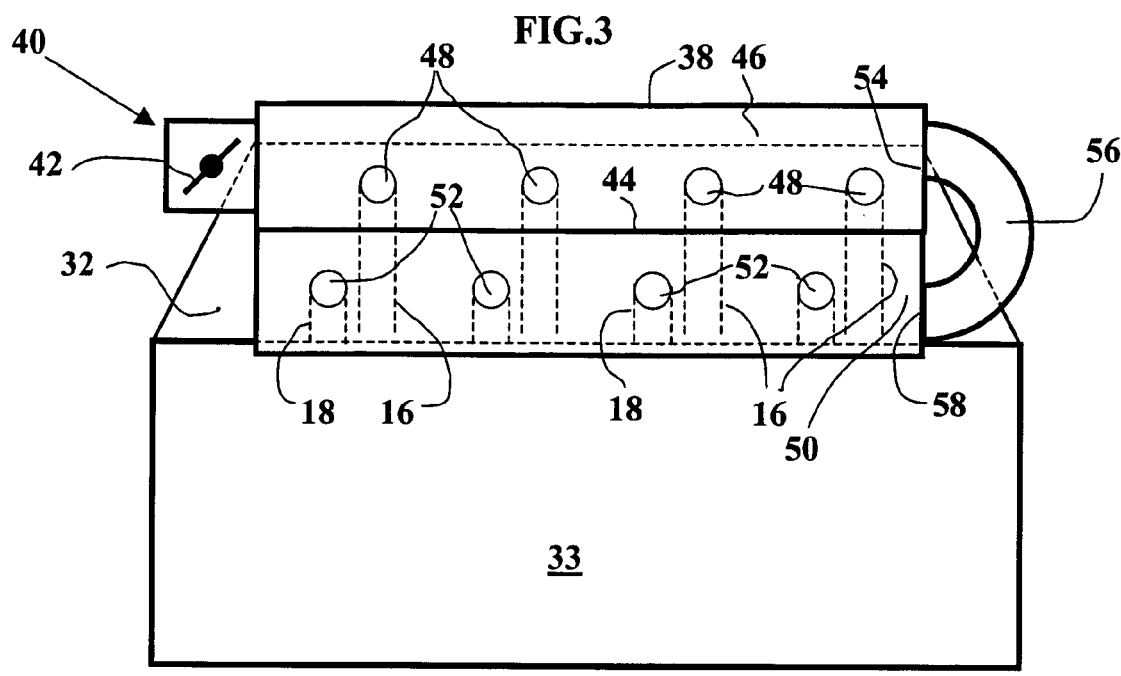
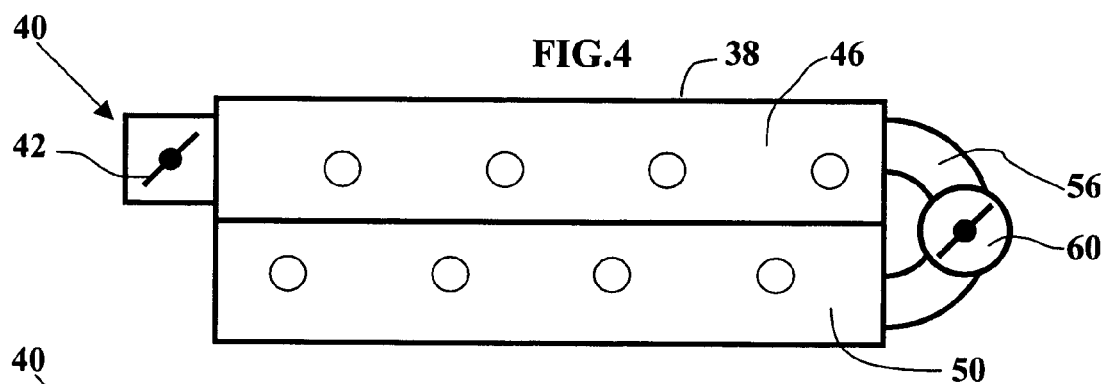
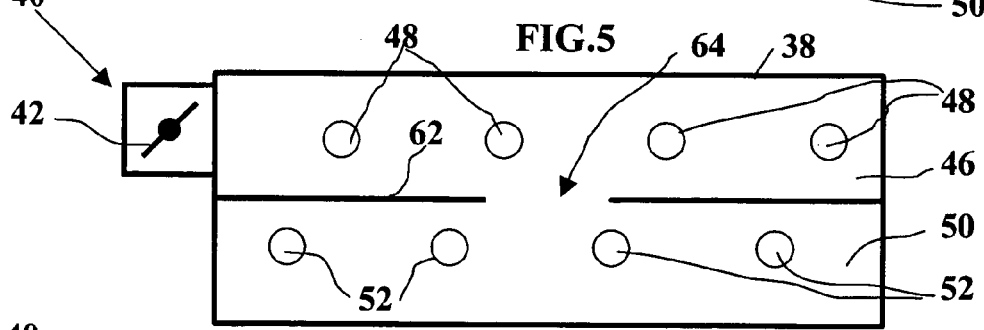
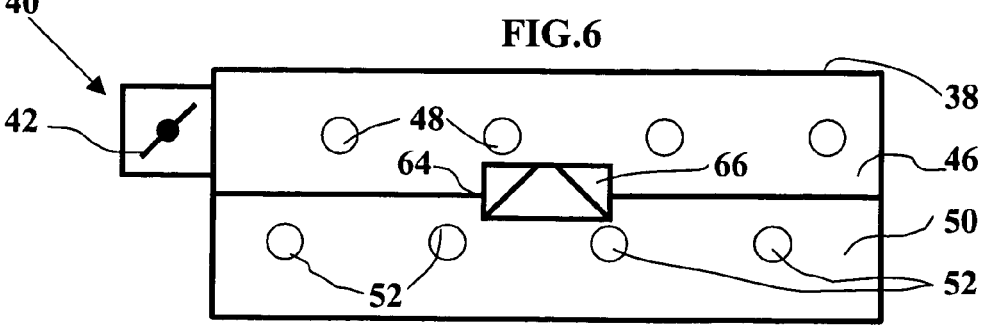

BURNT GAS-SCAVENGING INDIRECT-INJECTION INTERNAL-COMBUSTION SUPERCHARGED ENGINE AND SUPERCHARGED AIR SUPPLY METHOD FOR SUCH AN ENGINE

FIELD OF THE INVENTION

The present invention relates to a supercharged internal-combustion engine, notably an indirect-injection engine, and to a supply method for such an engine.

It more particularly relates to air supply means for a supercharged engine with burnt gas scavenging in the intake phase.

BACKGROUND OF THE INVENTION

As it is well-known, the power delivered by an engine depends on the amount of air fed into the combustion chamber. To increase this power, intake air that is compressed prior to being fed into the combustion chamber of the engine is used. This air, generally referred to as supercharged air, is compressed by any known means such as a turbosupercharger.

As already described in patent application FR-2,781,011 filed by the applicant, the power of a direct-injection supercharged engine can be increased even further by increasing the amount of supercharged air fed into the combustion chamber. The residual burnt gases contained in the combustion chamber are therefore discharged at the start of the intake phase of this engine and replaced by supercharged air. This operation, referred to as burnt gas scavenging, is carried out by overlap of the exhaust and intake valves. At the end of this operation, the intake phase continues, upon closing of the exhaust valves, with an injection of fuel into the combustion chamber.

The claimant has provided for this arrangement within the context of an indirect-injection supercharged engine as better described in French patent application No.02/07,693 filed on 21 Jun. 2002.

The burnt gas scavenging operation is intended to be carried out in this engine by addition of a specific intake means for non-carbureted supercharged air, essentially consisting of a pipe and of a valve. This engine thus comprises a first intake means intended to allow non-carbureted supercharged air to pass into the combustion chamber during the scavenging operation and a second means for allowing carbureted supercharged air to enter the combustion chamber upon closing of the first intake means. Thus, at the start of the air intake phase of the engine, the burnt gas scavenging operation is intended to be carried out by means of an overlap of the exhaust valves and of the non-carbureted supercharged air intake valve. During this overlap, the exhaust valves remain open and non-carbureted supercharged air is allowed to pass into the combustion chamber through the first intake means. The residual burnt gases are thus replaced by non-carbureted supercharged air. At the end of the scavenging operation, the exhaust valves close and carbureted supercharged air is allowed to pass into the combustion chamber through the other intake means that is provided with a fuel injector in case of multipoint fuel injection.

Generally, the free ends of the intake pipes are connected to supercharged air supply means, generally an intake manifold, whose inlet is connected to the outlet of the air compression means.

While the engine is running, the supercharged air which enters the manifold globally supplies all the intake pipes. In this case, there is a risk the carbureted supercharged air and the supercharged air from the non-carbureted air intake pipe may mix. Therefore, when the scavenging operation is carried out at the start of the intake phase, a partly carbureted supercharged air is fed into the combustion chamber, then discharged through the exhaust valves with the burnt gases.

This generates increased fuel consumption and leads to emissions at the exhaust, such as unburnt hydrocarbons.

The present invention is thus intended to overcome the aforementioned drawbacks by means of supercharged air supply means of simple design that prevent fuel bypassing between the two intake means while favouring the acoustics in the manifold.

SUMMARY OF THE INVENTION

The invention thus relates to a supercharged internal-combustion, notably indirect-injection engine comprising at least one cylinder with two types of supercharged air intake means, one type for non-carbureted supercharged air intake and another type for carbureted supercharged air intake, said intake means being supplied with supercharged air by supply means, characterized in that the supply means comprise a specific supercharged air supply device for each type of intake means.

Advantageously, in cases where the supply means comprise an intake manifold, said intake manifold can comprise an inner partition delimiting the supercharged air supply devices.

One of the supply devices can comprise a supercharged air inlet and means allowing communication with the other supply device.

The communication means can comprise a line connecting the supply devices.

Preferably, the connecting line can comprise a throttling means.

The communication means can comprise a passage in the partition.

Preferably, said passage can comprise a non-return means or a throttling means.

The supply means can comprise an air inlet common to the supply devices.

The air inlet can comprise a throttling means controlling the air intake in each supply device.

Preferably, the throttling means can be a butterfly valve.

The supply means can comprise an air inlet for each supply device.

The invention also relates to a supercharged air supply method for a supercharged internal-combustion, notably indirect-injection engine comprising at least one cylinder with two types of supercharged air intake means, one type for non-carbureted supercharged air intake and another type for carbureted supercharged air intake, said intake means being supplied with supercharged air by supply means, characterized in that each type of intake means is supplied with supercharged air separately.

Each type of intake means can be supplied with supercharged air successively.

Each type of intake means can also be supplied with supercharged air simultaneously.

BRIEF DESCRIPTION OF THE FIGURES

Other features and advantages of the invention will be clear from reading the description given hereafter by way of non limitative example, with reference to the accompanying drawings wherein:

FIGS. 3 to 11 are front views, with partial cross-section along line AA of FIG. 2, showing various embodiments of the supply devices of the invention in connection with FIG. 2.

DETAILED DESCRIPTION

Figure 1:
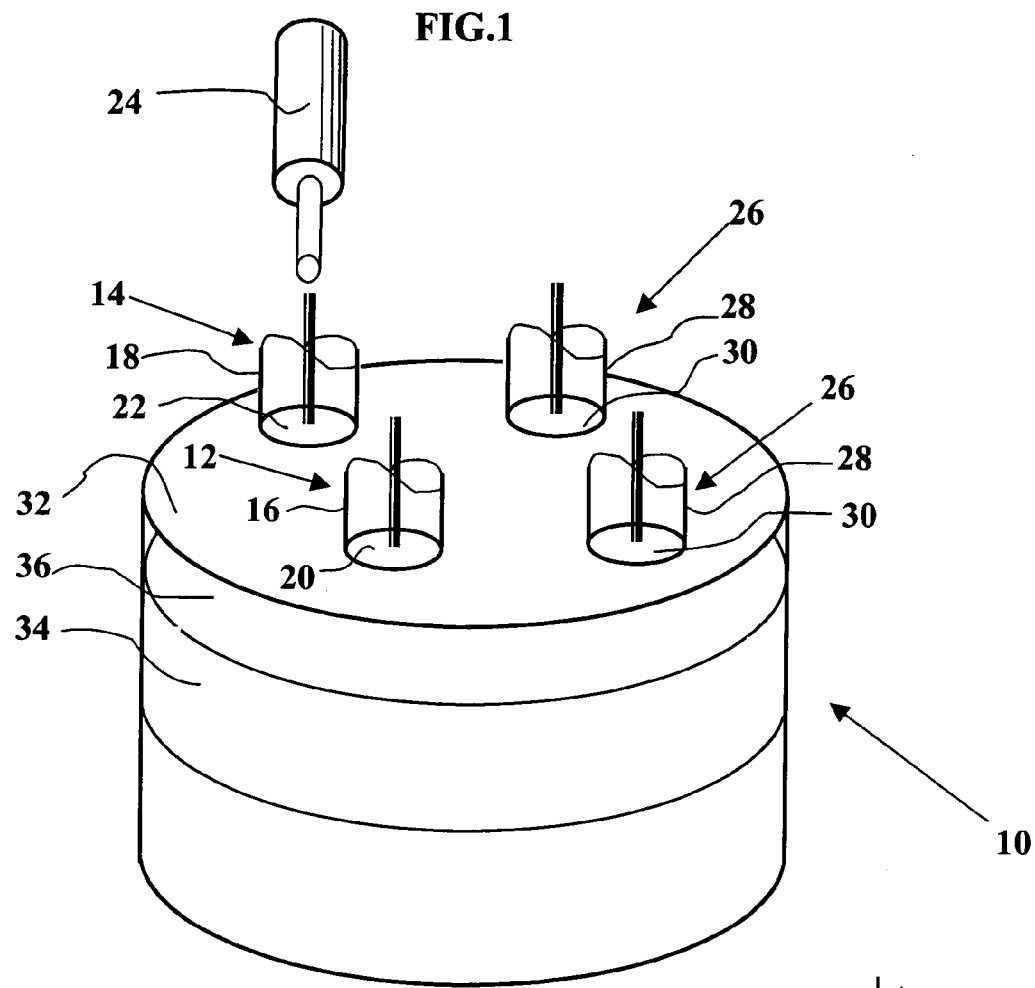
FIG. 1 shows a cylinder of a burnt gas scavenging supercharged engine used in the present invention.

FIG. 1 shows a cylinder 10 of an indirect-injection supercharged internal-combustion engine, notably a gasoline and preferably spark-ignition engine.

This cylinder comprises two types of supercharged air intake means 12 and 14 comprising each an intake pipe 16 and 18 and a shutoff means such as an intake valve 20 and 22. Intake pipe 18 is provided with a fuel injection means 24 whereas intake pipe 16 is not. For simplification of the description hereafter, pipe 16 and valve 20 will be referred to as non-carbureted supercharged air intake pipe and valve, whereas intake pipe 18 and valve 22 will be referred to as carbureted supercharged air intake pipe and valve.

This cylinder also comprises two exhaust means 26 with an exhaust pipe 28 and a shutoff means 30 such as an exhaust valve. The intake and exhaust means are carried by a cylinder head 32 allowing to delimit, with the upper part of a piston 34, combustion chamber 36 of this cylinder.

At the start of the intake phase and in the vicinity of the top dead center of piston 34, an overlap is carried out between exhaust valves 26 and non-carbureted supercharged air intake valve 20 so as to perform scavenging of the burnt gases present in chamber 36. The non-carbureted supercharged air, which is at a pressure higher than the pressure of the burnt gases present in this chamber, is thus allowed to pass therein and it scavenges the gases so as to discharge them through exhaust valves 30. As soon as exhaust valves 30 are closed, carbureted air intake valve 22 opens to allow a mixture of supercharged air and of fuel into the combustion chamber.

Figure 2:
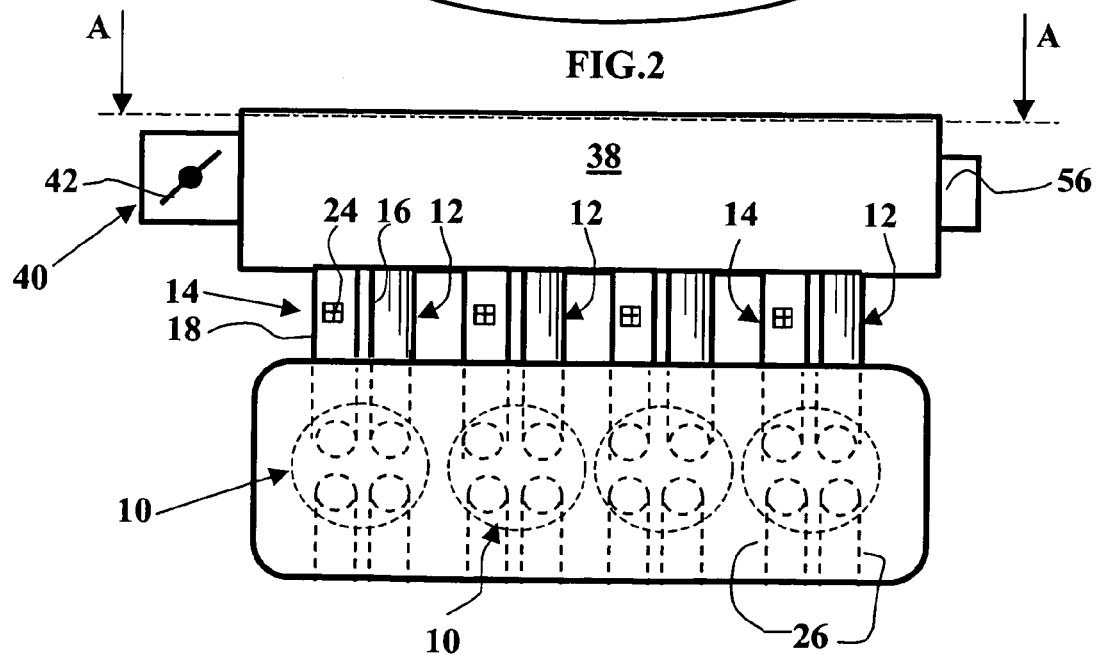
FIG. 2 shows, in elevation, an engine using the air supply devices according to the invention.

As can be seen in FIG. 2, cylinder 10 belongs to an engine comprising at least one cylinder, generally four cylinders, with cylinder head 32 carried by engine block 33.

Intake pipes 16 and 18 of each cylinder 10 are separately connected each to air supply means 38, generally referred to as intake manifold, connected by an inlet 40 to the outlet of an air compression means (not shown) such as a turbosupercharger. Inlet 40 is advantageously provided with throttling means 42, for example a butterfly type valve, which allows to adjust the amount of supercharged air fed into this manifold.

In a first embodiment of the invention, as shown in FIG. 3, intake manifold 38 comprises an inner partition 44 allowing to divide it into two independent half manifolds. Preferably, this partition consists of a sealed wall extending horizontally over the greatest length of the manifold by dividing it into two substantially equal and sealed parts. First half manifold 46, referred to as scavenging manifold, comprises supercharged air inlet 40 with its throttling means 42 and allows to supply, through orifices 48 referred to as scavenging orifices, each non-carbureted air intake pipe 16 of cylinders 10. Second half manifold 50, referred to as injection manifold, comprises orifices 52 referred to as injection orifices, allowing to communicate carbureted supercharged air intake pipes 18 with the inside of this injection manifold. Scavenging manifold 46 also comprises a supercharged air outlet 54 allowing to supply with supercharged air, through a line 56, an air inlet 58 provided in injection manifold 50.

Two distinct or separate supercharged air supply devices are thus formed, one for each air intake type. First device 46 supplies non-carbureted air intake pipes 16 and half manifold 50, whereas the second device only supplies carbureted air intake pipes 18.

While the engine is running, the supercharged air flows through inlet 40 into scavenging manifold 46 while supplying pipes 16 through orifices 48, then it supplies, through line 56, orifices 52 of injection manifold 50 for pipes 18. A series circulation of the supercharged air is thus obtained from scavenging manifold 46 to injection manifold 50.

No bypassing can thus occur between pipes 16 and 18 during the burnt gas scavenging operation, which is similar to the scavenging operation described in French patent application No.02/07,693 filed by the applicant. In fact, scavenging orifices 48 and injection orifices 52 are physically separated by partition 44 and there can be no communication between them. Besides, the supercharged air supply is carried out separately for the different intake pipe types.

The second embodiment of FIG. 4 is substantially identical to the embodiment of FIG. 3 and therefore comprises the same reference numbers.

In this embodiment, connecting line 56 is provided with a throttling means 60 such as a butterfly valve, which allows to control the amount of supercharged air allowed to pass into injection manifold 50 from scavenging manifold 46.

While the engine is running, the amount of supercharged air is controlled not only by valve 42 for the air admitted in scavenging manifold 46, but also by valve 60 for the air supplying injection manifold 50.

In the embodiment of FIG. 5, close to those described above, intake manifold 38 is also provided with a partition allowing to divide it into a scavenging manifold 46 and an injection manifold 50.

In this embodiment, the partition consists of an inner wall 62 comprising a passage 64 which allows to supply with supercharged air the injection manifold from the scavenging manifold. This wall extends horizontally over the greatest length of manifold 38 by dividing this intake manifold into two substantially identical parts.

The supercharged air flows into scavenging manifold 46 through supercharged air inlet 40 provided with its throttling means 42 to supply scavenging orifices 48, then it passes into injection manifold 50 through passage 64 to supply injection orifices 52.

Advantageously, as shown in FIG. 6, passage 64 is provided with a non-return means 66 such as a non-return valve, which prevents the supercharged air present in injection manifold 50 from flowing back into scavenging manifold 46. This non-return means thus guarantees a total absence of risk of a carbureted supercharged air upflow into the scavenging manifold.

Figure 7:
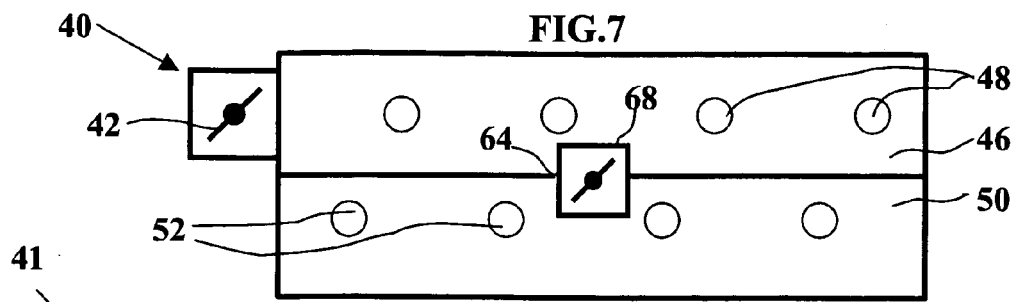

More advantageously yet, as shown in FIG. 7, passage 64 is provided with a throttling means 68, a butterfly valve for example, allowing to control, from scavenging manifold 46, the amount of air fed into injection manifold 50.

In the examples shown in FIGS. 3 to 7, successive supply of the scavenging manifold, then of the injection manifold thus allows to prevent bypassing phenomena.

Figure 8:
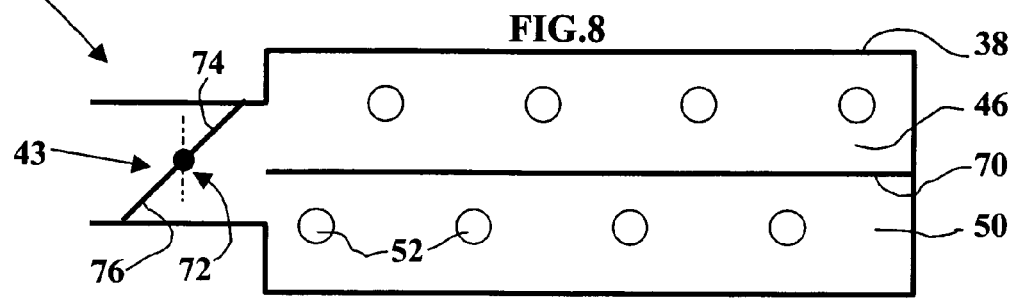

The embodiment of FIG. 8 shows an intake manifold 38 provided with a supercharged air inlet 41 with its throttling means 43 of butterfly valve type. This manifold comprises, in its volume, an inner separation partition 70 allowing to delimit a scavenging manifold 46 comprising scavenging orifices 48 and an injection manifold 50 with injection orifices 52.

In this embodiment, supercharged air inlet 40 is arranged in such a way that it simultaneously supplies the scavenging and injection manifolds. To obtain this simultaneous supply, partition 70 extends horizontally over the greatest length of manifold 38 and ends on the side of supercharged air inlet 40 so as to be placed in the same plane as the plane passing through the horizontal axis of rotation 72 of butterfly 43.

Advantageously, wings 74 and 76 of butterfly 43 extend, in closed position of air inlet 41, in a non-orthogonal way in relation to a plane passing through the partition. In the example of this figure, wing 74 is inclined forward in relation to a vertical axis passing through axis of rotation 72, i.e. in the direction of circulation of the air, and wing 76 is inclined backward, the opposite way from this direction of circulation. In this configuration, when the butterfly is in partial open position, the supercharged air supply is favoured for scavenging manifold 46 because wing 74 of the butterfly valve is in the same direction as the circulation of this air.

Figure 9:
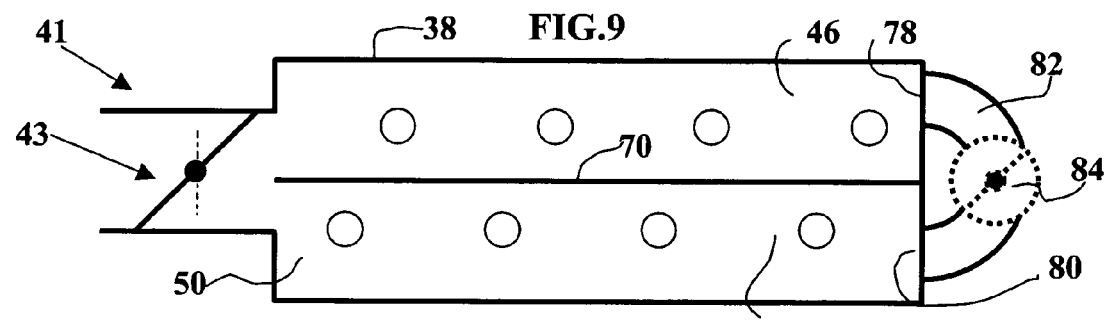

Advantageously, FIG. 9 shows another embodiment which is a variant of FIG. 8 and therefore comprises the same reference numbers.

In this embodiment, scavenging manifold 46 comprises a supercharged air outlet 78 and injection manifold 50 is provided with a supercharged air inlet 80 which is connected to air outlet 78 by a connecting line 82. Preferably, as shown in dotted line in this figure, line 82 is provided with a throttling means 84 such as a butterfly valve, which allows to control the amount of supercharged air admitted from the scavenging manifold.

Figure 10:
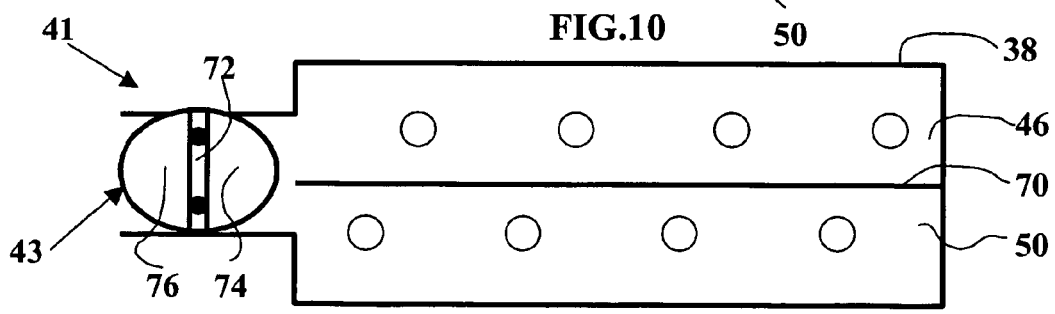

FIG. 10 is another embodiment of the invention showing another variant of FIG. 8.

In this variant, axis 72 of butterfly valve 43 is arranged substantially orthogonally to the plane passing through partition 70.

The supercharged air therefore enters in a practically identical way the scavenging 46 and injection 50 manifolds, wings 74 and 76 of the valve having no control effect on the air between the scavenging and injection manifolds.

Figure 11:
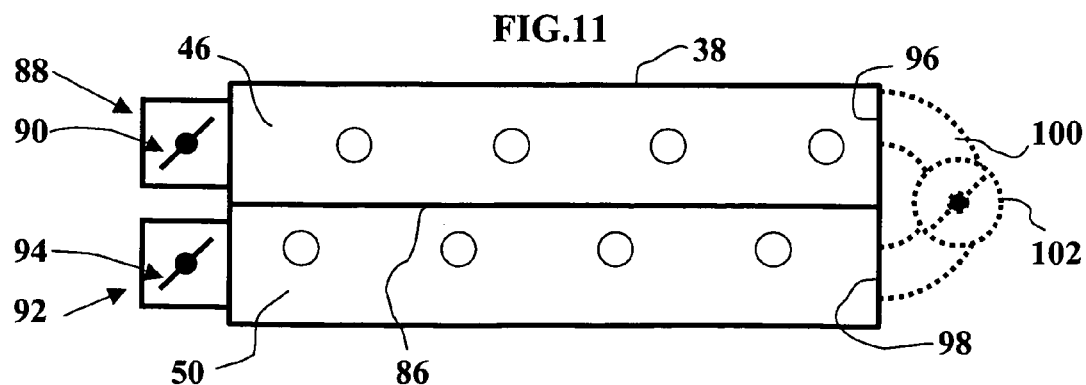

FIG. 11 is another embodiment wherein intake manifold 38 is divided by a partition 86 so as to form a scavenging manifold 46 and an injection manifold 50 as described above.

The scavenging manifold is provided with a supercharged air inlet 88 with a throttling means 90, and the injection manifold is also provided with a supercharged air inlet 92 with a throttling means 94.

Preferably, the scavenging manifold comprises a supercharged air outlet 96 communicating with an air inlet 98 provided on the injection manifold by means of a connecting line 100 advantageously provided with a throttling means 102 in form of a butterfly valve for example.

In the embodiments illustrated in FIGS. 8 to 11, the supercharged air supply of the scavenging and injection manifolds is essentially carried out in parallel, the manifolds being supplied through the same air inlet or each manifold through a specific air inlet. This also allows to prevent bypassing phenomena.

The present invention is not limited to the embodiments described above and includes all variants.

Mention is notably made, in the examples described in connection with FIGS. 3 to 7, of the fact that the scavenging and injection manifolds are supplied in this order with supercharged air.

This configuration is particularly favourable when the engine runs at high loads. In the case of partial load running, the air supply can be reversed by feeding the air into injection manifold 50, then into scavenging manifold 46 by arranging air inlet 40 on the injection manifold.

Furthermore, in the cases described in FIGS. 8 and 9, the inclination of wings 74 and 76 of valve 43 favours the supercharged air supply for scavenging manifold 46. This inclination can possibly be reversed so that wing 76 is inclined forward and wing 74 backward. The supercharged air supply is then favoured at the level of injection manifold 50.

The invention claimed is:

1. A supercharged internal-combustion engine comprising:
   at least one cylinder;
   a non-carbureted supercharged air intake;
   a carbureted supercharged air intake;
   a first intake manifold for supplying supercharged air to the non-carbureted supercharged air intake; and
   a second intake manifold for supplying supercharged air to the carbureted supercharged air intake.

2. The supercharged internal-combustion engine as claimed in claim 1, further comprising communication means connecting the first intake manifold to the second intake manifold.

3. The supercharged internal-combustion engine as claimed in claim 2, wherein the first intake manifold and the second intake manifold are each independent half manifolds arranged within a single manifold housing and separated by a partition.

4. A supercharged air supply method for a supercharged internal-combustion, engine comprising at least one cylinder with two types of supercharged air intake means for supplying supercharged air to the at least one cylinder, one type for non-carbureted supercharged air intake and another type for carbureted supercharged air intake, said intake means being supplied with supercharged air by supply means for supplying supercharged air to the intake means, characterized in that each type of intake means is supplied with supercharged air separately.

5. A supercharged air supply method as claimed in claim 4, characterized in that each type of intake means is supplied with supercharged air successively.

6. A supercharged air supply method as claimed in claim 4, characterized in that each type of intake means is supplied with supercharged air simultaneously.

7. A supercharged air supply method as claimed in claim 4, characterized in that the supercharged internal combustion engine is an indirect injection engine.

8. A supercharged internal-combustion, engine comprising at least one cylinder with two types of supercharged air intake means for supplying supercharged air to the at least one cylinder, one type for non-carbureted supercharged air intake and another type for carbureted supercharged air intake said intake means being supplied with supercharged air by supply means for supplying supercharged air to the intake means, characterized in that the supply means comprise a specific supercharged air supply device for each type of intake means.

9. An engine as claimed in claim 8, characterized in that the supply means comprise an air inlet for each supply device.

10. An engine as claimed in claim 8, characterized in that the supercharged internal-combustion engine is an indirect-injection engine.

11. An engine as claimed in claim 8, characterized in that the supply means comprise an air inlet common to the supply devices.

12. An engine as claimed in claim 11, characterized in that the air inlet comprises a throttling means for controlling air intake in each supply device.

13. An engine as claimed in claim 12, characterized in that the throttling means is a butterfly valve.

14. An engine as claimed in claim 8, wherein the supply means comprise an intake manifold, characterized in that said intake manifold comprises an inner partition delimiting the supercharged air supply devices.

15. An engine as claimed in claim 14, characterized in that one of the supply devices comprises a supercharged air inlet and communication means for allowing communication with the other supply device.

16. An engine as claimed in claim 15, characterized in that the communication means comprise a line connecting the supply devices.

17. An engine as claimed in claim 16, characterized in that the line connecting the supply devices is provided with a throttling means.

18. An engine as claimed in claim 15, characterized in that the communication means comprise a passage in the partition.

19. An engine as claimed in claim 18, characterized in that said passage comprises a non-return means.

20. An engine as claimed in claim 18, characterized in that said passage comprises a throttling means.

* * * * *